United States Patent
Kammans

(10) Patent No.: US 10,146,063 B2
(45) Date of Patent: Dec. 4, 2018

(54) FOCAL LENGTH EXTENDER FOR TELESCOPIC IMAGING SYSTEMS

(71) Applicant: Leica Camera AG, Wetzlar (DE)

(72) Inventor: Sigrun Kammans, Herborn (DE)

(73) Assignee: Leica Camera AG, Wetzlar (DE)

( * ) Notice: Subject to any disclaimer, the term of this patent is extended or adjusted under 35 U.S.C. 154(b) by 129 days.

(21) Appl. No.: 15/045,990

(22) Filed: Feb. 17, 2016

(65) Prior Publication Data

US 2016/0238854 A1    Aug. 18, 2016

(30) Foreign Application Priority Data

Feb. 18, 2015    (DE) .................... 10 2015 102 319

(51) Int. Cl.
G02B 27/40    (2006.01)
G02B 13/00    (2006.01)
(Continued)

(52) U.S. Cl.
CPC ......... *G02B 27/40* (2013.01); *G02B 13/0095* (2013.01); *G02B 17/008* (2013.01);
(Continued)

(58) Field of Classification Search
CPC .... G02B 27/10; G02B 27/106; G02B 27/126; G02B 27/14; G02B 27/144; G02B 27/16;
(Continued)

(56) References Cited

U.S. PATENT DOCUMENTS

D295,871 S  *  5/1988  Charles ........................ D16/130
D310,381 S  *  9/1990  Charles ........................ D16/130
(Continued)

FOREIGN PATENT DOCUMENTS

| DE | 38 09 656 A1 | 10/1989 |
| DE | 10 2010 061 302 A1 | 6/2012 |
| DE | 10 2011 056 757 A1 | 6/2012 |
| DE | 10 2014 109 095 A1 | 12/2015 |

OTHER PUBLICATIONS

Versacorp Astro Accessories, Jeffrey Charles, www.versacorp.com/vlink/product/astroprd.htm, available online at least as of 2009, accessed Aug. 14, 2017.*

(Continued)

Primary Examiner — Stephone B Allen
Assistant Examiner — Adam W Booher
(74) Attorney, Agent, or Firm — Crowell & Moring LLP

(57) ABSTRACT

The invention describes a focal length extender for a telescopic imaging system with interchangeable viewing eyepieces, including a cylindrical housing, which has a first and a second stop plane which are perpendicular to its cylinder axis in the direction of the light with associated connecting elements to the telescope body and for interchangeable viewing eyepieces and in which the housing has a relay lens arranged between the first stop plane and the second stop plane, wherein the relay lens is divided in two and consists of a first positive, neutral or negative lens element and a further negative lens element, wherein between the first and the further lens element, a beam splitter surface is arranged downstream at an angle to the optical axis of the imaging system and the first and further lens element together with the distance therebetween has an overall negative refractive power.

13 Claims, 1 Drawing Sheet

(51) Int. Cl.
  *G02B 17/00* (2006.01)
  *G02B 17/04* (2006.01)
  *G02B 23/04* (2006.01)
  *G02B 27/12* (2006.01)
  *H04N 5/225* (2006.01)
  *G02B 23/12* (2006.01)
  *G02B 27/14* (2006.01)

(52) U.S. Cl.
  CPC ........... *G02B 17/045* (2013.01); *G02B 23/04* (2013.01); *G02B 27/126* (2013.01); *H04N 5/2252* (2013.01); *G02B 23/12* (2013.01); *G02B 27/144* (2013.01)

(58) Field of Classification Search
  CPC .. G02B 27/40; G02B 13/0095; G02B 17/008; G02B 17/023; G02B 17/04; G02B 17/045; G02B 23/00; G02B 23/02; G02B 23/04; G02B 23/10; G02B 23/12; H04N 5/2252
  See application file for complete search history.

(56) References Cited

U.S. PATENT DOCUMENTS

| 5,742,434 A | 4/1998 | Carmeli |
| 2003/0197929 A1 | 10/2003 | Lee |
| 2006/0131492 A1* | 6/2006 | Kobayashi ......... G02B 26/0833 250/234 |
| 2008/0151090 A1* | 6/2008 | Becker .................. G02B 23/12 348/308 |
| 2009/0040600 A1* | 2/2009 | Vojtech .................. G02B 23/00 359/363 |
| 2012/0162758 A1 | 6/2012 | Zimmermann et al. |
| 2012/0212830 A1* | 8/2012 | Mewes ................ G02B 27/144 359/629 |

OTHER PUBLICATIONS

Astronomics, https://www.astronomics.com/image-erecting-prisms_c426.aspx, available online at least as of 2012, accessed Aug. 14, 2017.*
German Office Action issued in counterpart German Application No. 10 2015 102 319.9 dated Oct. 14, 2015 (three pages).

* cited by examiner

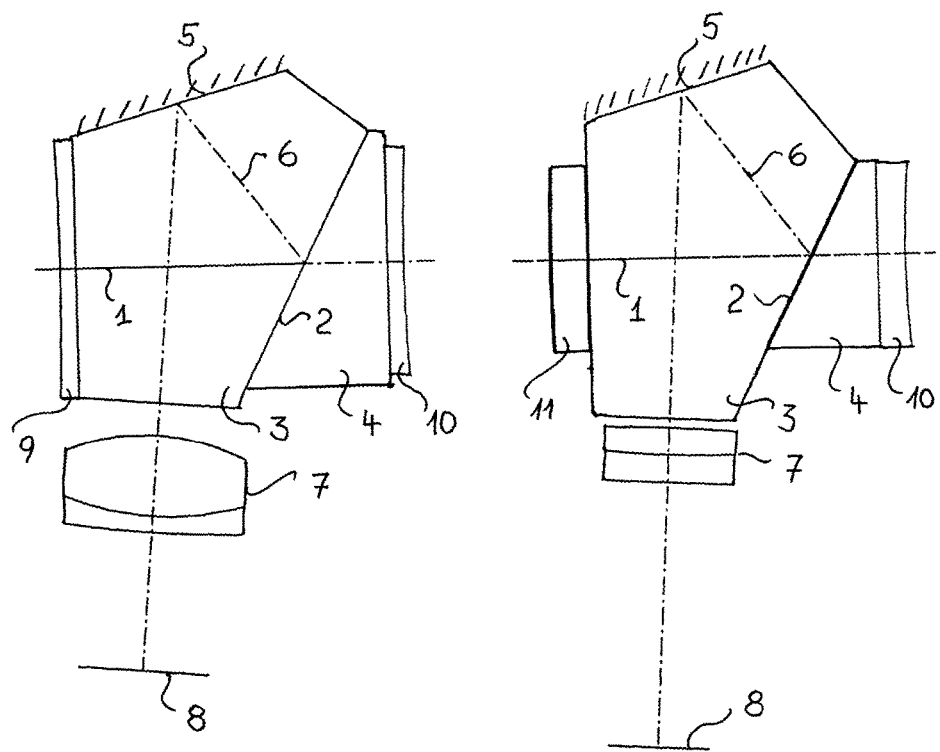

FOCAL LENGTH EXTENDER FOR TELESCOPIC IMAGING SYSTEMS

BACKGROUND AND SUMMARY OF THE INVENTION

The invention relates to a focal length extender with the features according to the preamble of claim 1.

A focal length extender of this type is known from the earlier patent application DE 10 2014 109 095.0 for a telescope with deflection system and interchangeable lenses. A relay lens connected to the extender with negative refractive power is arranged at a distance and in front of a first stop level of the extender in the direction of the light. Within the extender housing, an inclined beam splitter surface decouples a portion of the imaging beam.

The decoupled imaging beams can be received by an image receiving sensor and forwarded for digital image display and/or evaluation. With the extender, it is possible without changing the structure of the telescope to record an image of the respectively observed object and share this with other interested observers.

It is known to fix an adapter with an inversion system and eyepiece onto the locking device of a photo-interchangeable lens for SLR cameras and thus to use the photo lens as a telescope.

It is known from the publication DE 10 2011 056 757 A1 to construct a telescope in a modular fashion with interchangeable eyepieces, wherein the eyepiece module comprises an eyepiece lens, a magnification unit and an image inversion system. The objective lens with focusing lens following is a parting plane for exchanging of the eyepiece module.

A telescope adapter for supporting a camera is known from the publication US 2009/0040600 A1. The telescope adapter has a locking surface with fastener elements for locking at a telescope in place of an eyepiece. The adapter contains a lens assembly of negative refractive power at the light entry side for extending the focal length of the telescopic objective lens. In the extended imaging beam path, a beam splitter is located to produce an observation beam bundle and an image recording beam bundle. The observation is carried out via an eyepiece lens system of positive refractive power and the image recording via an image recording lens system of positive refractive power, which are parts of the telescope adapter. The image recording lens system is configured like an eyepiece lens system, in order to also produce an infinite image for the camera lens.

The support device for mounting the camera on the adapter is mechanically complex and with the housing for the image receiving lens system protrudes out from the adapter on one side to a great extent, whereby the view into the observation eyepiece and the balance while holding the telescope are hindered.

An interchangeable eyepiece adapter for a night vision device is known from the publication U.S. Pat. No. 5,742,434 A, in which a beam splitter is arranged in front of a biconvex exit lens of the eyepiece, said beam splitter decoupling a part of the imaging beam for display to an external observer.

A television eyepiece for visual optical devices is known from DE 38 09 656 A1, in which the intermediate image projected by the device lens is passed through an auxiliary lens into an image splitting prism and then received by a television camera. The device eyepiece and the television camera form a unit.

The object of the invention is to expand the aforementioned telescopic imaging systems formed as photo lenses or telescope lenses with respect to the possibility of a digital image decoupling, without impeding the originally intended usability of said eyepiece modules.

This object is achieved for a telescopic imaging system with a focal length extender of the aforementioned type according to the invention by means of the characterizing features of claim 1. Advantageous further developments are evident from the features of the dependent claims.

The invention is based on the finding that the telescopic imaging system can be arranged downstream from an interchangeable extender for the focal length of the telescopic imaging system, so that on the one hand space for the insertion of a beam decoupling element is created and on the other hand, on the exit side of the extender, the same imaging ratios exist for the eyepiece module to be used as for direct attachment to the telescopic imaging system.

Because sensor and camera technology evolve much faster than the technology of telescoping imaging systems, the invention offers the possibility for the insertion of an interchangeable extender housing, such that further developments are taken over by the exchange of a relatively cost-effective device, without necessitating a change in the remaining optical parts.

External mobile display devices as are already available can be used and interchanged at any time.

The optical decoupling system for image recording can be adjusted to an optimum sensor size, wherein through mirror and lens systems, the decoupling system presents good opportunities for correcting imaging errors during image recording.

Under consideration of the given imaging conditions of the telescopic imaging system, a negative refractive power is advantageous for a photo lens for the first lens member of the relay lens, in order to achieve space for the further decoupling optics through an additional extension of the focal length. A positive refractive power is advantageous in the telescope lens, in order to shorten the focal length to a distance that the further decoupling optics and the sensor have space within the extender housing. As a whole, a negative refractive power is to be provided for the relay lens intermediate optics in the observation beam path, in order to obtain a total focal length extension.

The negative refractive power may be relatively weak in the case of the telescopic lens, so that for the observation beam path, for example, only an additional 1.2-fold magnification results. In the photo lens, a stronger negative refractive power is advantageous, which results in a 1.5-fold magnification.

The mechanical extension between the stop levels in the interposed extender must correspond to the shift of the image planes created by the relay lens system.

The image captured by the camera sensor can be further processed and displayed by
- a processor integrated in the housing and a display mounted on the exterior of the housing,
- a processor integrated in the housing and an external display connected thereto via an integrated interface,
- via an integrated interface and with external processors and displays connected to the housing or
- via an external mobile communication device connected with an integrated interface.

The integrated interface may operate a cable connection and/or a wireless connection. Here, known and common connections and protocols are preferably used.

A small external mobile communication device may also be mounted on the housing or the telescopic imaging system at a convenient location with the use of a simple and ergonomic mechanical adapter.

Using a large external display or via a common connection with the integrated interface, the observed image may also be observed by other people, even those remotely located.

The beam splitter surface may be flat. However, it may also be curved (spherical, elliptical, freely formed) in order to cause a portion or all of the focusing of the decoupled beam path onto the sensor surface of the camera. A freely formed curvature may in particular be an anamorphic imaging curvature.

The beam splitter may consist of prisms or of a thin, partially transparent mirror, wherein a prism system with one or more free-formed surfaces may also be provided.

The optical axis to the camera sensor is preferably deflected at the beam splitter by 90°. However, flatter or steeper angles may also be provided. The shape of the extender housing can be adapted to the arrangement of the internal elements.

The lens system for the relay lens and imaging on the camera sensor may consist of one or more lenses, GRIN lenses or diffractive optical elements. The lenses may be made of glass and/or optical plastic and also have aspherical surfaces.

The adapted device should be oriented for landscape shots, wherein if needed, either the entire device or the unit with the beam splitter and sensor may be rotatable by 90° about the optical axis for portrait shots.

The camera module can also be equipped with an autofocus.

In the drawings, exemplary embodiments of the extender are shown schematically and described below in more detail with reference to the figures.

BRIEF DESCRIPTION OF THE DRAWINGS

FIG. 1 shows the extender optic for a photo lens, and
FIG. 2 shows the extender optic for a telescope lens.

DETAILED DESCRIPTION OF THE DRAWINGS

The extender optic illustrated in FIG. 1 shows the optical axis 1 of an imaging beam path coming from a photo lens, not shown, and extending to an eyepiece module, also not shown. The image beams are partially reflected by a beam splitter surface 2 arranged at an angle to the optical axis 1. The beam splitter surface 2 is inserted in a prism system constructed from two prisms 3, 4. The prism surface 5 is mirrored and directs the decoupled imaging beams 6 via the imaging lenses 7 to a camera sensor 8.

On the light entry side, a first lens element 9 of the relay lens is attached to the prism 3. On the light exit side, a further lens element 10 of the relay lens is placed on the prism 4. Both lens elements 9, 10 together have a negative refractive power.

In the exemplary embodiment shown in FIG. 2, which is suitable for a telescope lens, parts identical to those in FIG. 1 are provided with the same reference characters. Here, the first lens element 11 of the relay lens arranged on the light entry side has a positive refractive power. The further lens element 10 in turn has a negative refractive power.

The housing which encloses the extender optic and its stop surfaces are not shown. The design must be adapted to the existing photo lens or telescope lens and operated by an experienced engineer in accordance with his expertise in the art. This also applies to the arrangement of suitable image processors, interfaces and displays.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE CHARACTERS 1 optical axis
2 beam splitter surface
3, 4 prisms
5 mirrored prism surface
6 decoupled imaging beam
7 imaging lenses
8 camera sensor
9; 11 first lens element relay lens
10 further lens element relay lens

The invention claimed is:

1. A focal length extender for a telescopic imaging system with interchangeable viewing eyepieces, the focal length extender comprising:
   a cylindrical housing, which has a first and a second stop plane, the first and the second stop plane being perpendicular to an axis of the cylindrical housing in the direction of a light, with associated connecting elements to a telescope body and to interchangeable viewing eyepieces; and
   two relay lenses arranged between the first stop plane and the second stop plane, wherein
      the two relay lenses consist of a first positive, neutral or negative lens element and a further negative lens element, the two lens elements being positioned on a same axis,
      between the first and the further lens elements, a beam splitter surface is arranged downstream at an angle to an optical axis of the imaging system,
      the first and the further lens elements together with the distance therebetween have an overall negative refractive power,
      the two relay lenses being immovable relative to the cylindrical housing, and
      the focal length extender obtaining the same imaging characteristics for the interchangeable viewing eyepieces.

2. The extender according to claim 1, wherein the front- and rear-side beam splitter surface in the direction of light is connected to a beam splitter element with optically transparent prisms with light entry and light exit surfaces standing perpendicular to the optical axis.

3. The extender according to claim 1, wherein the beam splitter surface has a freely formed curvature.

4. The extender according to claim 1, wherein optical deflection and/or imaging elements with an electric imaging sensor with a processor in their imaging plane are arranged in the light beam which is reflected from the beam splitter surface after entry into the extender and which emerges from the beam splitter element.

5. The extender according to claim 4, wherein the optical deflection and/or imaging elements and the imaging sensor with processor are arranged within the housing.

6. The extender according to claim 4, wherein the processor is connected with a data transmission interface.

7. The extender according to claim 6, further comprising a display configured to illustrate the image recorded from the imaging sensor, wherein the display is arranged inside or outside the housing, and the display is controllable via the interface.

8. The extender according to claim 7, wherein a screen within the housing can be observed via the rear-side beam splitter surface.

9. The extender according to claim 7, wherein external communication data can be displayed via the interface on the display arranged within the housing.

10. The extender according to claim 1, wherein the housing of the extender or an intermediary lens barrel of the extender containing the beam splitter, the imaging optic and the imaging sensor is arranged in a manner which is rotatable about the optical axis of the two relay lenses with respect to an eyepiece view.

11. The extender according to claim 1, wherein the viewing eyepiece contains a prism or lens inversion system.

12. The extender according to claim 1, wherein the telescopic imaging system is a photo lens.

13. The extender according to claim 1, wherein the two lens elements are fixedly mounted with a beam splitter interposed therebetween.

\* \* \* \* \*